Patented Feb. 16, 1937

2,070,856

UNITED STATES PATENT OFFICE 2,070,856

PURIFICATION OF WATERS WITH HYDROGEN PEROXIDE

Elmore E. Butterfield, Forest Hills, N. Y.

No Drawing. Application September 16, 1931, Serial No. 563,235

3 Claims. (Cl. 210—2)

This invention relates to improvements in the purification of polluted or otherwise objectionable waters, natural, treated or waste, which contain injurious amounts of organic nitrogenous matter, by disinfection and oxidation with hydrogen peroxide. One such water is sewage, which however contains a greater amount of such matter than other waters, to which this process is applicable.

The invention relates more particularly to a method of treating sewage in which hydrogen peroxide is used as a disinfectant and oxidizing agent.

The object of this invention is to obtain the maximum benefits from hydrogen peroxide oxidation and to bring hydrogen peroxide into economical competition with other methods of oxidation, by suitable preliminary treatment, where necessary, of the liquids to be oxidized.

Sewage which has been freed of the greater part of its suspended solids and as much of the dissolved solids as are customarily removable by absorbent filter-aids is especially suitable and amenable to the oxidation by hydrogen peroxide.

Other objects and advantages of the invention will hereinafter appear in the following description, and the novel features thereof will be particularly pointed out in the appended claims.

Heretofore chlorine has been generally employed for the disinfection of water and sewage. In the quantities ordinarily employed, chlorine does not oxidize objectionable organic substances in such waters and its disinfecting reaction requires prolonged time of contact; for example half an hour for the disinfection of domestic sewage. The slowness of the disinfecting reaction of chlorine necessitates the employment of special apparatus for controlling the dosage and the provision of storage facilities for holding the retarded flow of liquid for the necessary time of contact with chlorine. The odor and taste of drinking waters which have been subjected to chlorination are frequently objectionable, if not actually deleterious to health in repeated doses, particularly when chlorophenols are present. A further disadvantage of chlorine is its high affinity for ammonia and ammonium compounds which are always present in waters polluted with nitrogenous organic substances. The affinities of chlorine and its compounds for ammonia and its compounds are among the highest known chemical affinities. Reactions between chlorine and ammonia divert chlorine from the purpose for which it was introduced into the waters to be treated. The germicidal action of chlorine is attributed to the formation of chloramines which are poisonous and destructive to bacterial life. It is uncertain whether the chloramines are derived from ammonia in the liquid undergoing disinfection or whether they are the result of a direct union of chlorine with the amino-groups in the bacterial protoplasm. Since the affinities of ammonia and amines for chlorine are of practically the same magnitude, it will be appreciated why little or no oxidation of putrescible organic matter is possible in the presence of ammonia, even when chlorine is used in quantities over and above those necessary for disinfection but not sufficient to satiate the ammonia requirements. The addition of sufficient chlorine to combine with all of the ammonia in sewage or polluted waters would result in costs which would not be tolerated in the practical treatment of water and sewage.

The cost of other oxidizing agents, such as potassium permanganate, ozone and ultraviolet radiation, has precluded their use except in the case of very slightly polluted waters, or waters which had already been subjected to an almost complete purification.

Hydrogen peroxide and ozone should not be confused with one another. Hydrogen peroxide is a syrupy liquid of a specific gravity of 1.5 and has the molecular formula, $H_2O_2$. Ozone is a polymeric form of oxygen, it has the molecular formula, $O_3$, and is made by the ionization and molecular rearrangement of gaseous, usually atmospheric, oxygen under the influence of the silent discharge of a high tension electrical current. Hydrogen peroxide is odorless while ozone has a sharp pungent odor and is extremely irritating to mucous membranes. Hydrogen peroxide is regarded structurally as dihydroxyl, HO—OH, while the structural formula of ozone is

Heretofore, hydrogen peroxide has been used almost exclusively as a bleaching agent. It is a most powerful oxidizing agent, second possibly only to pure ozone. It reacts promptly with organic compounds which are hardly affected by chlorine. The rapidity of organic oxidations by means of hydrogen peroxide is accelerated by peroxidases which are present in animal and vegetable substances. It destroys pathogenic micro-organisms. It is not diverted from its oxidizing reactions by the presence of ammonia. These advantages have not heretofore been applied to the purification of water and sewage, and previous knowledge of hydrogen peroxide oxidations has been limited to its behavior in faintly alkaline solution. Compared with chlorine, the cost per pound is high. However, if the cost be calculated in units of equivalent oxidizing and disinfecting effects, it is reasonable.

The disclosure of the effects of hydrogen peroxide as a disinfectant and oxidizing agent for the purification of waters and the lowering of economic barriers by the proper interpretation of the effects as well as by improved methods of production, brings hydrogen peroxide into economic range for the practical disinfection and purification of waters under proper conditions of application and utilization.

The reactivity of hydrogen peroxide is great, not only with organic compounds, but also with certain inorganic salts, ferrous salts in particular, and even with finely divided metals themselves. This high reactivity of hydrogen peroxide permits of an extremely wide range in its application to the treatment of waters, embracing all kinds, from drinking water containing only traces of organic matter and bacteria, up to and including strong sewage and trade wastes. The preliminary treatment of such waters and the dosage of hydrogen peroxide must be varied with the chemical composition and bacterial flora of the liquid to be treated. Hydrogen peroxide is too valuable as an oxidizing agent to be squandered on substances that can be removed by less costly means. Waters which have been treated chemically or filtered are all suitable for the economical employment of hydrogen peroxide as a disinfectant and oxidizing agent. By virtue of its oxidizing powers, hydrogen peroxide destroys tastes and odors in such waters, whereas chlorine frequently imparts a taste when used only in quantities sufficient to produce the degree of bacterial removal required by the local standards for drinking water.

Sewage should be freed from suspended matter, because hydrogen peroxide can be wasted in the oxidation of cellulose which in itself is inoffensive and even beneficial in furthering the removal of suspended and dissolved putrescible organic matter. Absorptive and adsorptive cellulosic substrates of spongy texture, such as corn cobs, wastes from the cotton fields, and paper pulp can, in fact, be used to advantage in the clarification of sewage. If used for this purpose, they should be removed from the liquid along with the suspended solids before the hydrogen peroxide is applied. Animal and vegetable peroxidases in the suspended sewage solids constitute another source for the diversion of hydrogen peroxide from the oxidations and disinfection for which it is being used; the catalytic action of the peroxidases can decompose hydrogen peroxide so rapidly that there will not be sufficient time of contact for useful oxidations.

It is not fully appreciated that the chemical composition and bacterial flora of untreated sewage are ever changing quantities. There is a two-thousand-fold increase in the quantity of living bacteria in domestic sewage from the moment of its origin up to the tenth hour. The bacterial increase is accompanied by changes in the composition and quantities of suspended and dissolved solids which serve as bacterial foods. After the tenth hour at ordinary temperature, there is a subsidence of bacterial growth, and products of bacterial autolysis or self-digestion make their appearance. The products of bacterial autolysis are just as difficult to oxidize and dispose of as the putrescible organic substances in human excreta. Under such conditions of changing composition, it is impossible to set a pre-determined figure for the dosage of hydrogen peroxide. If the analysis of a sewage relates to one period and the dosage of hydrogen peroxide is applied at a constant rate indicated by that analysis, the results of treatment are likely to be misleading. Attempting to treat sewage in which maximum bacterial growth has been allowed to develop, greatly increases the work and cost of disinfection due to the greater number of micro-organisms to be destroyed and due also to the formation of bacterial slimes or zoogleal masses which are more difficult to penetrate than single micro-organisms.

Since the changing composition of sewage with time is caused by bacterial growth acting upon suspended and dissolved sewage solids, most of the difficulties arising from varying composition and necessitating varying dosages of hydrogen peroxide can be obviated by early and prompt removal of suspended solids and of such dissolved solids as can be removed by chemical precipitants and absorbents. The dosage of hydrogen peroxide for such effluents from promptly clarified sewage can be fixed accurately according to the analytical properties of the liquid.

The effectiveness of hydrogen peroxide can be further increased by adjusting the reaction of the liquid to be treated. Adjustment of the reaction of the liquid is used in the physical chemical sense of adjusting the concentration of hydrogen ions. The velocity of hydrogen peroxide reactions is increased with ascending concentration of hydrogen ions. The alkalinity of fresh sewage is due to ammonia resulting from the hydrolysis of urea. Living bacteria not only consume ammonia but they also produce organic acids and carbon dioxide which neutralize ammonia in the formation of ammonium carbonate and ammoniates of the organic acids. Untreated sewage turns from alkaline to acid with the progression of bacterial growth. Sewage which has been limed for the purpose of removing suspended solids and a part of the dissolved solids will remain alkaline. In the terms of physical chemistry it will be appreciated that an acid liquid has a positive concentration of hydrogen ions while an alkaline liquid has a positive concentration of hydroxyl ions which latter is equivalent to a negative concentration of hydrogen ions. To meet these varying conditions of acidity and alkalinity encountered in untreated sewage and in limed sewage, the introduction of carbon dioxide, obtained from flue gases or as a by-product of lime recovery from the chemical precipitation of sewage, as described in co-pending application Ser. No. 480,145, affords a convenient and economical means of adjusting the hydrogen ion concentration of the liquid to be treated by hydrogen peroxide. This is an important factor, since it is obvious that constancy of initial hydrogen ion concentration cannot be expected in any of the liquids to be treated, not even in the case of limed sewage, where the hydrogen ion concentration after liming will depend to a great extent upon the hardness or softness of the water supply which goes to make up the sewage. Adjustment of the reaction of the liquid by means of carbon dioxide affords a means of accelerating hydrogen peroxide oxidations to offset undue retardation as can occur in alkaline solutions. The carbon dioxide should be added concurrently with the hydrogen peroxide, meaning that the addition of carbon dioxide to the mixture to be treated may occur either just prior to the introduction of hydrogen peroxide or simultaneously therewith or immediately following.

Since the reactions of hydrogen peroxide are much faster than chlorine reactions in aqueous solutions, complicated dosing apparatus and additional liquid storage space for prolonged retention periods are not necessary. Hydrogen peroxide may be introduced into clarified waste waters by direct or trickling feed. Intimate mixture of hydrogen peroxide with the reacting liquids is necessary and this may be secured by baffles or by aerating devices used in earlier stages of the treatment of sewage.

I claim:

1. The method of purifying sewage containing nitrogenous matter characterized by the presence of protein and its degradation products, comprising separating out the suspended matter by the use of an absorptive and adsorptive cellulosic substrate, and by the use of lime as a precipitating agent, said lime being in excess, leaving the resulting effluent alkaline, thereafter adding hydrogen peroxide as an oxidizing agent, and concurrently therewith carbon dioxide as an adjuster of the hydrogen ion concentration.

2. The method of purifying waters containing nitrogenous matter comprising the separating out of the bulk of said matter, and thereafter adding to the effluent hydrogen peroxide and concurrently therewith a chemical to adjust the hydrogen ion concentration of the effluent.

3. The method of claim 2 in which carbon dioxide is the chemical employed to adjust the hydrogen ion concentration.

ELMORE E. BUTTERFIELD.